H. H. HAYES.
ROPE MEASURING MECHANISM.
APPLICATION FILED JAN. 25, 1907.

960,321.

Patented June 7, 1910.
2 SHEETS—SHEET 1.

H. H. HAYES.
ROPE MEASURING MECHANISM.
APPLICATION FILED JAN. 25, 1907.
960,321.
Patented June 7, 1910.
2 SHEETS—SHEET 2.
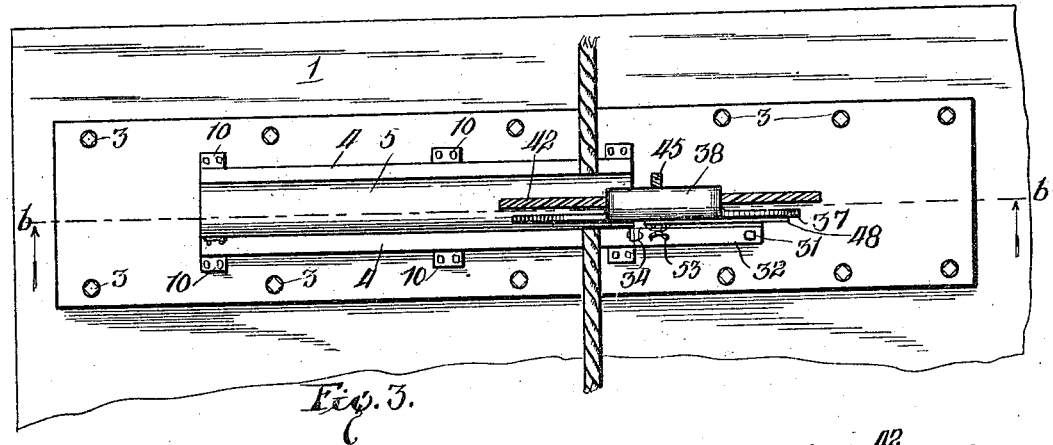
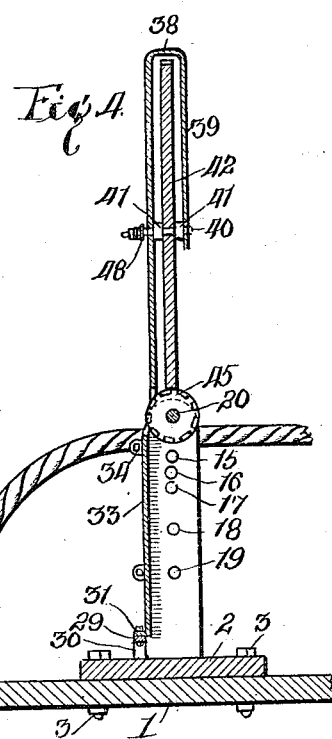
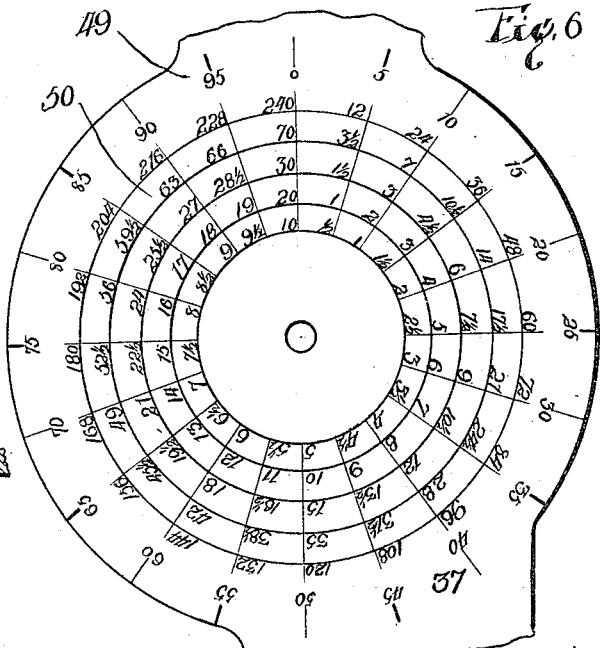
Witnesses
Wm. P. Bond
Frances M. Frost
Inventor
Harley H. Hayes
by Banning & Banning
Attys.

UNITED STATES PATENT OFFICE.

HARLEY H. HAYES, OF ST. PAUL, MINNESOTA, ASSIGNOR OF ONE-HALF TO BERNARD C. BECKMAN, OF NAPERVILLE, ILLINOIS.

ROPE-MEASURING MECHANISM.

960,321.        Specification of Letters Patent.        Patented June 7, 1910.

Application filed January 25, 1907. Serial No. 354,070.

*To all whom it may concern:*

Be it known that I, HARLEY H. HAYES, a citizen of the United States, residing at St. Paul, county of Ramsey, and State of Minnesota, have invented certain new and useful Improvements in Rope-Measuring Mechanism, of which the following is a specification.

It is desirable that retail dealers should have some quick and ready means for accurately and positively measuring any desired number of feet of rope, and in connection with the measuring have means for determining the weight of the rope measured.

The object of the present invention is to construct a mechanism by the use of which ropes of varying diameters can be readily, quickly and accurately measured and the weight computed therefrom, and this without any inconvenience or trouble to the party manipulating the rope.

Other objects of the invention are to construct a mechanism adapted for operation with ropes of varying diameters; to enable the withdrawal of the rope from the reel or bundle to actuate the mechanism; to locate two rollers, one having a fixed relation and the other adjustable for the passage of ropes of different diameters, and cause the travel of the rope between the rollers to revolve the roller having a fixed relation and actuate a pointer coöperating with scales for indicating the length of rope drawn through between the rollers; to furnish a guideway for directing different diameters of rope between the rollers; to provide the fixed roller with a driving pinion for operating a revoluble gear to actuate the pointer for the scales; and to improve generally the several elements entering into the structure of the mechanism as a whole.

The invention consists in the features of construction and combinations of parts hereinafter described and claimed.

Figure 1:
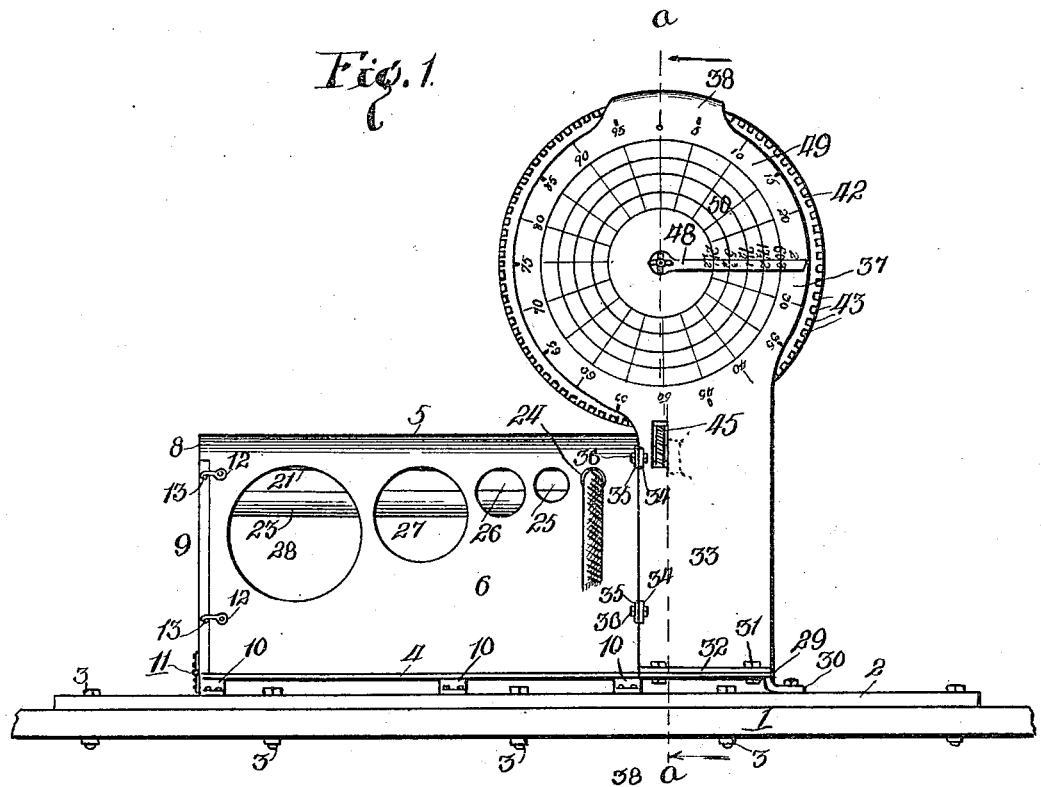
Figure 2:
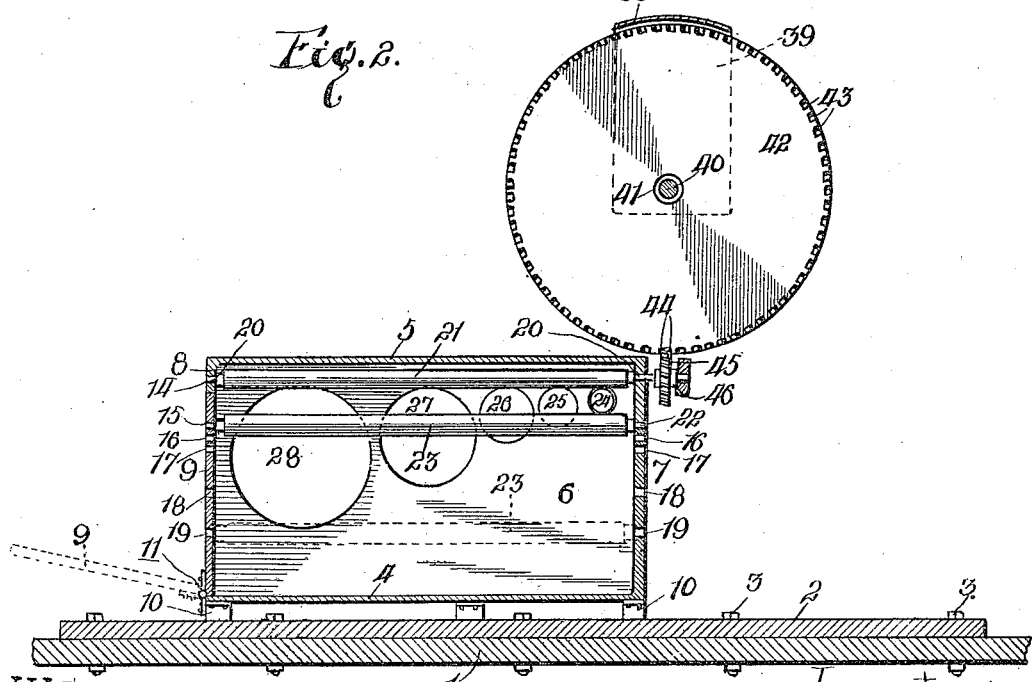

In the drawings illustrating the invention Figure 1 is a front side elevation of the mechanism; Fig. 2 a sectional elevation showing the rollers, the driving pinion and the revoluble gear; Fig. 3 a top or plan view of the mechanism; Fig. 4 a cross section on line *a—a* of Fig. 1 looking in the direction of the arrow; Fig. 5 a detail enlarged and in section, showing the mounting for the revoluble gear and the indicating pointer; and Fig. 6 an enlarged face elevation of the disk having thereon the measuring and weight computing scales.

The mechanism, in the construction shown, has a base or shelf 1, on which is secured a plate 2, by bolts 3, passing through the plate and base. A support or casing formed of a bottom or base plate 4, a cover or top plate 5, a front wall 6, an end standard 7, and an end piece or strip 8 furnishes a support and closure for the operating rollers. The base 4, cap 5, wall 6, end standard 7 and end piece or strip 8 can be a single casting, or the several parts can be formed separate and secured together by bolts, or in any suitable manner. The closure or support for the operating rollers is completed by an end standard 9 having a hinge connection at its lower end, and the closure or support, as a whole, is attached to the plate 2 by feet 10 and suitable bolts, as shown in Figs. 1 and 2. The standard 9 is connected at its lower end with the plate 4 by means of a hinge 11, so that the standard 9 can be raised and lowered, as shown by the dotted lines of Fig. 2, and for holding the standard upright, in the arrangement shown, hooks 12 pivoted to the front wall 6 engage pins 13 on the standard and sustain the standard in its upright and vertical position, as shown in Fig. 1.

The standard or upright 7 and the end piece or strip 8 each have a hole 14, and the standard 7 and the standard 9 have a plurality of holes 15, 16, 17, 18 and 19 spaced at irregular distances apart, with the holes of one standard in line with the holes of the other standard, which holes 14, 15, 16, 17, 18 and 19 are for mounting the operating rollers within the closure or support. The holes 14 receive journals, or the ends of a shaft 20, supporting a roller 21 in a fixed relation, which roller 21 is integral with or fixed on the shaft 20 so as to revolve freely, and the holes 15, 16, 17, 18 and 19 receive the journals, or ends of a shaft 22, supporting a roller 23, so as to revolve freely and allow the roller 23 to be adjusted higher or lower to accommodate ropes of different diameters, for the ropes to pass between the rollers, and in passing revolve both rollers. The casing or front wall 6, in the construction shown, has therein a series of holes 24, 25, 26, 27, 28 and 29 to accommodate ropes of different diameters, so that a rope passing through a corresponding hole of the same diameter will impinge against the rollers 21 and 23 and revolve the rollers, as the rope is drawn through the holes or guides for measuring and weighing the length of rope desired.

A support or bar 29 having a depending leg 30 is attached to the plate 2 by bolts or otherwise. The support or bar 29 has attached thereto by bolts 31 a flange 32 of a standard or upright 33, and the standard or upright has on one edge ears 34 coinciding with ears 35 on the end of the main closure or support, so that, by means of bolts 36, the standard 33 can be attached to the main closure or support. The standard or upright 33, at its upper portion is formed into a circular disk 37, and at the top of the disk 37 is a neck or bend 38 continued downward to furnish a plate or hanger 39, as shown in Figs. 1, 2 and 4. The center of the disk 37 has entered therethrough a shaft 40, which is supported in hubs or bearings 41, on the hanger 39 and the disk, as shown in Fig. 5. The shaft 40 has fixedly mounted thereon, by a spline or key, a gear 42 having peripheral cogs or leaves 43, which mesh with peripheral cogs or leaves 44 on a pinion 45, fixedly mounted on the end of the shaft 20 of the roller 21, and held in adjusted position by means of lug or jam-nuts 46, so as to maintain the proper mesh between the pinion and gear; and as shown, the end of the shaft 20 is supported in a lug extending out from the standard or upright 33, so as to insure a firm support for the pinion between the standard 7 and the ear, and thereby maintain the intermesh of the pinion and gear. The shaft 40 rotates with the gear 42, and on this shaft, adjacent to the front face of the disk 37, is a pointer 48, which coacts with a scale 49 and a scale 50 on the face of the disk. The scale 49 is graduated in feet measurements, and the scale 50 is graduated for pound weighing, and the weight computing scale is divided into a plurality of cycles, which cycles are for different diameters of rope, that is to say, one cycle would indicate the weight of a length of rope in feet for a half inch rope, and another cycle would indicate the weight for the length in feet of a three-quarters inch rope, and so on for different diameters of ropes. The pointer 48 is attached to a stem extending out from the shaft 40 and having a square section 51 for the pointer, and a threaded section 52 for the reception of a thumb nut 53, between which and the face of the pointer is a spring washer 54, for holding the pointer on the stem and enabling a quick release of the pointer for return to its normal position at the cipher of the measuring scale, which return is attained by receding the thumb nut to release the bearing washer sufficiently to enable the pointer to be withdrawn from the square hub or section 51, and turned back to normal position; and such return of the pointer is necessitated by the employing of diagonal or inclined cogs or leaves for the gear and pinion, which cogs or leaves prevent any backward movement of the gear, thus insuring the accurate and positive measurement of the desired length of rope. It will be understood that the scale for weight computing is graduated so as to suit ropes of different winding, as a tight-wound rope will weigh more than a loosewound rope for the same length of rope.

The operation will be understood from the foregoing description, but briefly is as follows: The end of a rope of the required size is passed through a hole or guide of corresponding size in the main closure or support, and between the rollers, with the rollers adjusted apart the distance corresponding to the diameter of the rope, that is, at a distance of half an inch apart for a half inch rope, three-quarters of an inch apart for a three-quarters inch rope, and an inch apart for an inch rope, and so on up to the limit of the size of ropes it is desired or intended for the operation of the mechanism. The drawing of the rope through between the rollers 21 and 23 will revolve the rollers, and the revolving of the roller 21 will revolve the pinion 45, imparting rotation to the gear 42 and through the gear to the shaft 40. The rotation of the shaft 40 will advance the pointer from the zero point around the scales, and when the desired length of feet of rope has been drawn through between the rollers such fact will be indicated on the scale 49, and at the same time the weight of the measured rope will be indicated on the scale 50, so that by the mere act of drawing through the required length of rope the measurement and weight will be indicated on the scales, enabling the operator of the mechanism to determine quickly, accurately and positively, when the required length of rope has been measured, and at the same time, and with the same mechanism the operator can ascertain by the scale 50 the weight of the rope.

The mechanism is simple in construction, and can be manipulated readily and easily, and by its use an accurate measurement for the length of rope is obtained, and a positive weight for the length of rope is shown, thus making the mechanism one very desirable and useful for dealers and others handling ropes for the trade or otherwise.

What I claim as new and desire to secure by Letters Patent is:

1. In a rope measuring mechanism, the combination of a fixed standard and a movable standard, each provided with a series of holes at graduated distances apart, a fixed roller, an adjustable roller mounted in the standards, a pinion for the fixed roller, and a revoluble gear in mesh with the pinion, substantially as described.

2. In a rope measuring mechanism, the combination of a fixed standard and a movable standard, each provided with a series of holes at graduated distances apart, a fixed roller, an adjustable roller mounted in the standards, a pinion for the fixed roller, a revoluble gear in mesh with the pinion, a shaft having the gear fixedly mounted thereon, a pointer carried by the shaft, and a dial having a measuring scale coöperating with the pointer, substantially as described.

3. In a rope measuring mechanism, the combination of a fixed standard and a movable standard, each provided with a series of holes at graduated distances apart, a fixed roller, an adjustable roller mounted in the standards, a pinion for the fixed roller, a revoluble gear in mesh with the pinion, a shaft having the gear fixedly mounted thereon, a pointer carried by the shaft, and a dial having a weight indicating scale coöperating with the pointer, substantially as described.

4. In a rope measuring mechanism, the combination of a fixed standard and a movable standard, each provided with a series of holes at graduated distances apart, a fixed roller, an adjustable roller mounted in the standards, a pinion for the fixed roller, a revoluble gear in mesh with the pinion, a shaft having the gear fixedly mounted thereon, a pointer carried by the shaft, and a dial having a measuring scale, and a weight indicating scale coöperating with the pointer, substantially as described.

5. In a rope measuring mechanism, the combination of a fixed standard and a movable standard, each provided with a series of holes at graduated distances apart, a fixed roller, an adjustable roller mounted in the standards, a pinion for the fixed roller, a revoluble gear in mesh with the pinion, and a wall with graduated holes for different sizes of ropes, said holes corresponding with the graduated holes of the standards, substantially as described.

HARLEY H. HAYES.

Witnesses:
J. A. JACKSON,
E. G. LUND.